United States Patent [19]

Nunnery

[11] 3,768,569

[45] Oct. 30, 1973

[54] GRASS-TRIMMING DEVICE

[76] Inventor: Eugene B. Nunnery, 5113 W. Gate Hills, Meridian, Miss. 39301

[22] Filed: Mar. 22, 1971

[21] Appl. No.: 126,622

[52] U.S. Cl. ................................... 172/17, 47/33
[51] Int. Cl. ........................................... A01d 35/00
[58] Field of Search ......................... 47/33; 172/13–17; 94/26, 31; 52/102

[56] References Cited
UNITED STATES PATENTS

| 2,662,342 | 12/1953 | Peterson | 47/33 |
| 2,075,301 | 3/1937 | Pipenhagen | 172/15 |
| 3,217,480 | 11/1965 | Orr | 56/256 |
| 3,346,053 | 10/1967 | Allegrelli | 172/16 |
| 2,654,180 | 10/1953 | Redfield | 47/33 |
| 643,677 | 2/1900 | Payne | 47/33 |
| 2,994,254 | 8/1961 | Shumaker | 94/26 |
| 3,545,127 | 12/1970 | Jensen | 94/31 |

Primary Examiner—Robert E. Pulfrey
Assistant Examiner—Eugene H. Eickholt
Attorney—Fleit, Gipple & Jacobson

[57] ABSTRACT

A track-guided cutting apparatus comprising a yoke frame secured to a handle with the yoke frame carrying an axle. A cutting disc and plurality of wheels of resilient material are rotatably mounted on the axle, with the rotation of the wheels driving the cutting disc. The cutting disc is adapted to run in a groove defined by the track to shear vegetation overlying the track.

18 Claims, 4 Drawing Figures

PATENTED OCT 30 1973 3,768,569
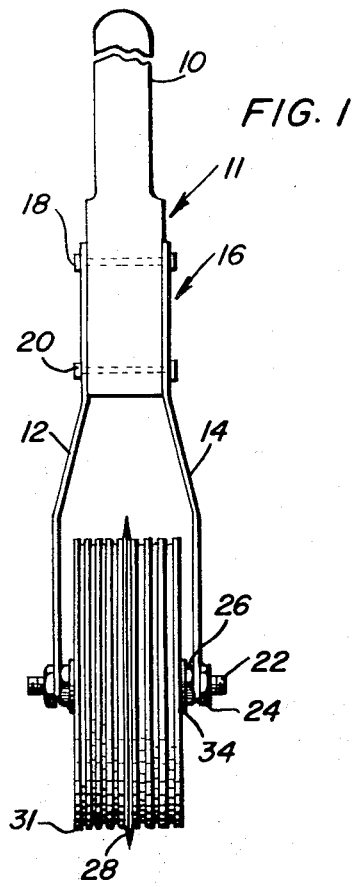
FIG. 1
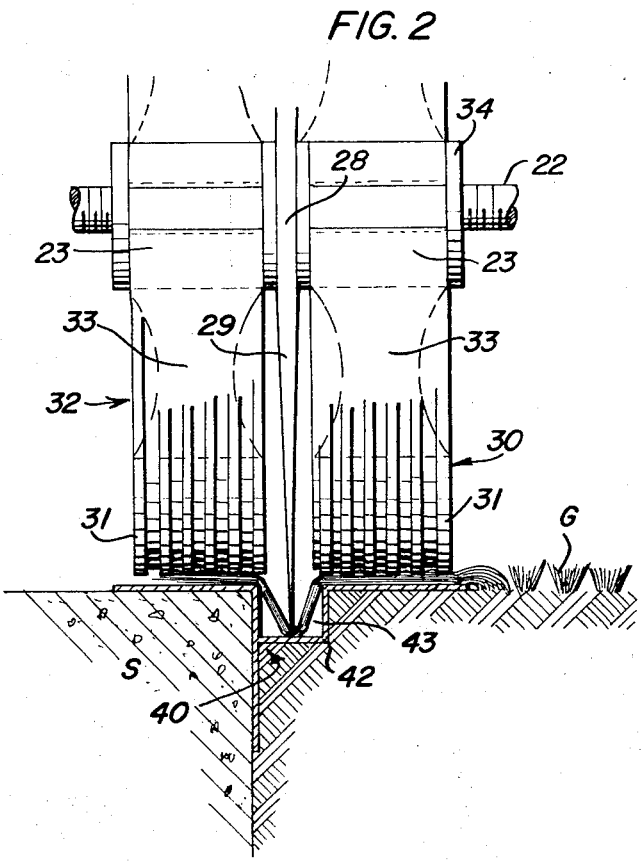
Eugene B. Nunnery
INVENTOR
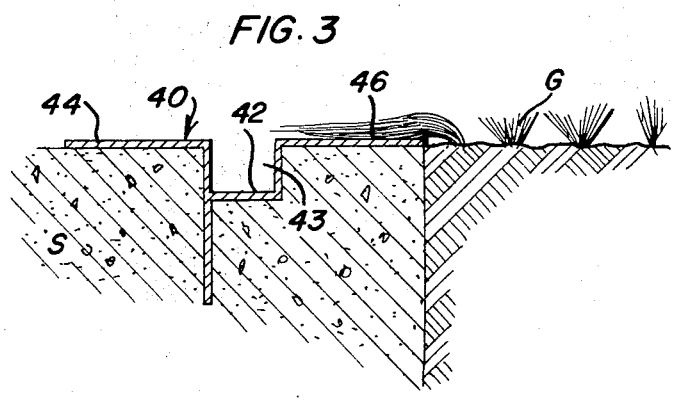
BY
Fleit, Gipple & Jacobson,
ATTORNEY.

GRASS-TRIMMING DEVICE

The present invention generally relates to an edging tool for trimming and shearing grass and other vegetation and is specifically concerned with a manually propelled track-guided cutting apparatus having a rotating cutter disc with a continuous cutting edge. The cutter disc is rotatably mounted about an axle and is propelled by adjacent wheels of resilient material rotatably mounted on the same axle so that the cutting disc protrudes beyond the circumference of the wheels and severs vegetation growing over the track.

Previous lawn and garden trimmers and edgers are known in the prior art, and such known trimmers are shown by U.S. Pat. Nos. 2,494,223, 2,673,396, 2,718,743 and 3,217,480. One of the problems encountered with such known lawn and garden trimmers is that when the shearing disc is rotated for the cutting action, the cutting edge is quickly dulled by its constant contact with the ground. If the disc encounters a foreign object or obstruction in the ground underneath the grass or vegetation to be cut, the cutting edge of the disc can be bent out of alignment so that the cutting action is significantly retarded. These previously known trimmers were subject to constant damage, which frequently caused the user to have to replace either the entire apparatus or the cutting blade itself.

Another problem found in prior rotary cutting devices is that they do not effectively sever all the blades of grass or vegetation in that the blades of grass or vegetation are bruised, crushed or brushed aside by the tool and not effectively severed.

The present invention overcomes these problems by combining a previously laid track defining a cutting and guiding groove or channel with a rotating cutting blade which neatly severs the grass or other vegetation overlying the groove or channel as the blade is rotating therein and guided thereby. The track allows a narrow, even cut to be made on the grass or vegetation along the edge of the area being trimmed.

The edger of the present invention can be simply and economically manufactured of a minimum number of sturdy, durable component parts, which will require little repair or maintenance during normal use. The invention's construction enables the apparatus to be relatively lightweight and compact so that it can be easily operated and stored in a small area.

In addition, the invention is easily propelled along the track in that there is no twisting of the handle from hitting foreign substances, allowing a straight decisive cut or trim of the vegetation. The invention can be manually operated by children or other personnel with a minimum physical effort and with great safety, as the cutting edge is kept in a predetermined track and runs over a predetermined area, thus eliminating flying objects and high-speed blade rotation which occur with power-operated cutters.

Other features and advantages of the invention will be apparent from the following description of the embodiments of the invention as shown in the accompanying drawings.

BRIEF DESCRIPTION OF THE DRAWINGS

FIG. 1 is a partial front elevational view of the cutting apparatus of the present invention.

FIG. 2 is an enlarged fragmentary elevational view of the cutting apparatus of the present invention with the cutting blade in cutting relation with the track.

FIG. 3 is a cross-sectional view of the track installed in a newly poured sidewalk.

FIG. 4 is a cross-sectional view of the track installed on existing sidewalk.

DETAILED DESCRIPTION OF THE PREFERRED EMBODIMENT AS SHOWN IN THE DRAWINGS

The cutting apparatus of the invention, generally designated by numeral 11, as shown in FIGS. 1 and 2, comprises an elongated handle 10, which can be constructed of any material and which is preferably of such a length that the operator using the tool can conveniently use the tool in a standing position. Connected to the handle 10 are side arms 12 and 14, which together form a yoke frame 16. The upper portion of side arms 12 and 14 are secured to the handle 10 by a pair of through fasteners 18 and 20, which are preferably rivets, but which can also be bolts, screws or the like. The lower ends of arms 12 and 14 have openings therein for receiving axle 22. The axle 22 preferably has threaded end sections for receiving positioning nuts 24 and 26.

A single circular cutting disc 28 is rotatably mounted on axle 22 and is bounded on each side by wheels 30 and 32. The cutting disc 28 is so dimensioned that its surface is gradually tapered as at 29 and its diameter is greater than wheels 30 and 32, which allows the blade 28 to extend into the groove or channel portion 43 of the track 40 while the wheels engage the horizontal flanges 44 and 46 as shown in FIG. 2. The wheels 30 and 32 preferably have a hard inner body portion 33 and a soft outer body portion or tread 31, made of rubber or other resilient material, such as synthetic resins. This soft tread allows the wheels to slightly depress during operation of the apparatus and, with a minimum of downwardly directed pressure, to hold the grass or vegetation tightly in place across or in the track to thereby aid the cutting blade in severing the vegetation.

Washers 34 as shown in FIG. 1 are positioned on the axle 22 to keep nuts 26 from contacting the hub or wheel body. However, if desired, nuts 26 can be in direct communication with wheel hub or wheel bearing means 23. Nuts 26 are preferably screwed or fastened onto axle 22 against the washers 34 or wheel hubs 23 to hold the wheels 30 and 32 in place against the circular cutting disc 28. The nuts 26 are bounded by the yoke side arms 12 and 14, which are in turn held in a fixed relationship on the axle by lock nuts 24, which are fastened onto the axle 22. The wheels 30 and 32 are preferably mounted on bearing means 23 which rotate around axle 22.

The horizontally disposed track 40, in which the apparatus 11 is designed to run, includes a body 42 defining a preferably U-shaped guide and a cutting channel 43 and horizontal support flanges 44 and 46. The flanges extend from the track body and serve as a road surface for wheels 30 and 32. The cutting disc 28 cooperates with the cutting channel 43 to cut grass and other vegetation growing over the channel. A vertical support flange 48 extends substantially perpendicular to the plane formed by the horizontal flanges 44 and 46 so that the cutting channel 43 can be securely anchored in place.

The track 40 is preferably manufactured out of aluminum or plastic; however, other suitable materials can be used for its construction. It can be manufactured in sections which are longitudinally joined together or it may be custom built to any desired length. The track can be readily installed by embedding it in newly poured concrete, as shown in FIG. 3, or by attaching it to the edge of existing sidewalks, drives or other structures, as shown in FIG. 4, by the use of an epoxy glue. In addition, the track material can be of various colors which enhance its decorative value.

While the invention is primarily envisioned as being used in residential areas, a heavier and larger cutting apparatus using a heavier gauge track with a deeper groove can be used for larger areas, as, for example, estates, cemeteries, parks and similar areas. In an embodiment of this size, the cutting blade provides a high torque with a minimum rolling resistance, and its weight plus the weight of the apparatus provides momentum urging the apparatus forward to perform the cutting operation.

In operation, the apparatus 11 is placed upon the track 40 so that the tread 31 of wheels 30 and 32 engages horizontal support track flanges 44 and 46, and the cutting disc 28 is positioned in the guiding and cutting channel 43. The user supplies forward and downward force sufficient to propel the apparatus along the track and to push the cutting disc 28, protruding into the groove 43, deep enough to make contact with the bottom of the groove, if necessary to accomplish the cutting action. The soft tread of the wheels is slightly compressed by the downward force, thus holding the grass or vegetation taut across the groove, enabling the cutter disc 28 to shear the grass or vegetation G in a guided, even manner. By pushing the handle 10 and rotating the wheels over the track 40, the blade or cutting disc 28 turning with the wheels as one, cuts the grass or vegetation G which has grown over the track onto the sidewalk or other area S. Thus the cutting disc and track channel enable the rotating cutting disc to be protected from the dirt and other damaging objects.

While the preferred embodiment of the invention has been disclosed, it is understood that the invention is not limited to such an embodiment since modifications will be apparent to those skilled in the art without departing from the interest and scope of the present invention as defined by the appended claims.

I claim:

1. A grass-trimming system comprising: a horizontally disposed track having a groove therein; at least one wheel being resilient and adapted to run along at least one edge of said groove; a substantially vertically disposed cutting disc rotatable with said at least one wheel, the difference between the diameter of said cutting disc and said wheel being not more than the depth of said groove; and motive means in operative relationship with said wheel and said cutting disc for imparting a forward and downward force on said wheel for moving said wheel and said cutting disc along said track and serving grass overlaying said groove; said apparatus further characterized in that the diameter and resiliency of said at least one wheel are so selected that the edge of said cutting disc will make contact with the bottom of said groove when said at least one wheel and said disc are rolled along said track under the influence of said forward and downward force.

2. Apparatus according to claim 1 wherein the bottom of said groove is substantially horizontal at the point of contact with said cutting disc.

3. Apparatus according to claim 1 wherein the diameter and resiliency of said at least one wheel are so selected that said at least one wheel is deformed by an amount sufficient to hold grass laying across said groove taughtly in place as said at least one wheel rolls along said track.

4. Apparatus according to claim 1 wherein the width of said cutting disc is smaller than the width of said groove.

5. Apparatus according to claim 1 wherein said cutting disc has a continuous circular cutting surface, a greater diameter than said at least one wheel and is tapered over a major portion of its radius.

6. Apparatus according to claim 1 wherein said track comprises a substantially U-shaped body defining a cutting channel.

7. Apparatus according to claim 6 further comprising at least one horizontal flange extending from said body and vertical anchoring means connecting to said body.

8. Apparatus as claimed in claim 7 wherein said vertical anchoring means is a flange extending substantially perpendicular to said horizontal supporting flanges.

9. Apparatus according to claim 1 comprising a first wheel made of a resilient material positioned on one side of said cutting disc and a second wheel made from a resilient material having a diameter identical to the diameter of said first wheel and operatively positioned on the other side of said cutting disc.

10. Apparatus according to claim 1 further comprising a shaft axially positioned in the center of said at least one wheel and the center of said cutting disc and rotatably attached to said at least one wheel and said cutting disc, said apparatus further characterized in that said motive means is a handle fixedly secured with respect to said shaft for holding and rolling said at least one wheel and said disc along said track.

11. Apparatus according to claim 10 wherein said shaft is connected to a yoke and further wherein said yoke is connected to said handle.

12. In a combination lawn edger and trimmer, a track section defining a cutting channel having a substantially horizontal bottom, a cutting disc adapted to be inserted in, and guided by, said cutting channel, an axle rotatably secured to the center of said cutting disc, at least one wheel rotatably mounted to said axle, the difference between the diameter of said cutting disc and said wheel being not more than the depth of said groove, said at least one wheel being adapted to drive said cutting disc, a yoke carrying said axle, and a handle secured to said yoke; said apparatus further characterized in that the diameter and resiliency of said wheel and the diameter of said cutting disc are so selected than when said cutting disc moves in said cutting channel, the edge of said cutting disc makes contact with the substantially horizontal bottom of said groove.

13. A combination lawn edger and trimmer as claimed in claim 12 wherein said cutting channel is defined by a substantially U-shaped body.

14. A combination lawn edger and trimmer as claimed in claim 12 wherein said U-shaped body has secured thereto horizontal flanges extending away from its sides and at least one vertical anchor flange extending substantially perpendicularly from said horizontal flanges.

15. A combination lawn edger and trimmer as claimed in claim 12, wherein said cutting disc has a circular configuration forming a continuous circular cutting edge, said disc configuration being of a greater diameter than said at least one wheel.

16. A combination lawn edger and trimmer as claimed in claim 13, further including at least one horizontally positioned flange extending outwardly from said track, said horizontally positioned flange forming a road surface for said at least one wheel.

17. A grass-trimming system comprising: a horizontally disposed track having a groove therein; at least one wheel adapted to run on at least one edge of said groove; and a substantially vertically disposed cutting disc rotatable with said at least one wheel; said apparatus further characterized in that the diameter of said at least one wheel is so selected that the edge of said cutting disc will make contact with the bottom of said groove when said at least one wheel and said disc are moved along said track.

18. A grass-trimming system comprising: a horizontally disposed track having a groove therein; a pair of wheels adapted to run along the edge of said groove; and a cutting disc rotatable and concentric with and intermediate said wheels, the difference between the diameter of said cutting disc and said wheel being not more than the depth of said groove, said apparatus further characterized in that the diameters of said wheels are so selected that said cutting disc will make contact with the vertically lowest portion of said groove when said wheels and said disc are moved along said track.

* * * * *